(12) United States Patent
Whitney et al.

(10) Patent No.: US 8,838,316 B2
(45) Date of Patent: Sep. 16, 2014

(54) METHOD OF CONTROLLING CATALYST LIGHT-OFF OF A HYBRID VEHICLE

(71) Applicant: GM Global Technology Operations LLC, Detroit, MI (US)

(72) Inventors: Christopher E. Whitney, Commerce, MI (US); Jeffrey M. Hutmacher, Fowlerville, MI (US); J Michael Ellenberger, Huntington Woods, MI (US); James B. Nicholson, Albion, MI (US); Rafat F Hattar, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/647,471

(22) Filed: Oct. 9, 2012

(65) Prior Publication Data

US 2014/0100728 A1    Apr. 10, 2014

(51) Int. Cl.
*B60W 20/00* (2006.01)
*B60W 10/06* (2006.01)
*B60W 10/08* (2006.01)

(52) U.S. Cl.
USPC .......................... 701/22; 180/65.265; 903/930

(58) Field of Classification Search
CPC ..... B60W 10/06; B60W 10/08; B60W 20/00; B60W 30/192

USPC .......................... 701/22; 180/65.265; 903/930
See application file for complete search history.

(56) References Cited

U.S. PATENT DOCUMENTS

| | | | |
|---|---|---|---|
| 2009/0283070 A1* | 11/2009 | Whitney et al. | 123/339.11 |
| 2010/0038158 A1* | 2/2010 | Whitney et al. | 180/65.265 |
| 2010/0057325 A1* | 3/2010 | Livshiz et al. | 701/102 |
| 2011/0088659 A1* | 4/2011 | Wang et al. | 123/350 |
| 2011/0288713 A1* | 11/2011 | Pursifull et al. | 701/22 |

* cited by examiner

*Primary Examiner* — Mary Cheung
*Assistant Examiner* — Brian P Sweeney
(74) *Attorney, Agent, or Firm* — Quinn Law Group, PLLC

(57) ABSTRACT

A method of warming a catalyst of an exhaust gas treatment system of a hybrid vehicle includes transitioning a rotational speed of an engine to within a pre-defined speed range with an electric motor, and reducing an engine manifold pressure to within a pre-defined pressure range. The engine is fueled after the rotational speed of the engine is within the pre-defined speed range, and the engine manifold pressure is within the pre-defined pressure range. While the engine is being fueled, the engine manifold pressure is increased to within a catalyst light-off pressure range, and the torque output of the engine is increased to within a catalyst light-off operating torque range. The exhaust gas produced from the operation of the engine within the pre-defined speed range, within the catalyst light-off pressure range, and within the catalyst light-off operating torque range heats the catalyst while minimizing emissions.

12 Claims, 3 Drawing Sheets

METHOD OF CONTROLLING CATALYST LIGHT-OFF OF A HYBRID VEHICLE

TECHNICAL FIELD

The invention generally relates to a method of warming a catalyst of an exhaust gas treatment system of a hybrid vehicle.

BACKGROUND

In a gasoline engine, over 99% of the emissions that come out of the engine are converted to clean output ($H_2O$ and $CO_2$) by the catalyst in the catalytic converter. However, to operate properly, the catalyst must be heated to a temperature equal to or above a light-off temperature. The light-off temperature is approximately equal to 400° C. The majority of the exhaust gas emissions that are captured exiting the exhaust gas treatment system during an emissions test occur during the first 60 seconds of engine operation while the catalyst temperature is below the light-off temperature, and can not efficiently convert the engine out emissions to $H_2O$ and $CO_2$.

Conventional vehicle powertrains typically will execute a Catalyst Light Off (CLO) strategy immediately upon starting the engine when the drivetrain is in park or neutral and hope to finish before the driver tips into the accelerator pedal and drives away. This way the focus of CLO strategy can be on the emissions performance of the engine and not the drivability of the vehicle. Some hybrid powertrain combinations can achieve the maximum acceleration that the driver requests with the electric motors by themselves. These combinations can often start the engine, with the engine decoupled from the drivetrain, and perform the CLO strategy in a way that is much like the conventional powertrain in terms of focus on emissions. However, many hybrid powertrain combinations have an engine that provides a major portion of the vehicles propulsion. These vehicles will often use a feature called "Silent Start" where the engine is not started as soon as the driver enables the propulsion system. Instead the engine will be started some time later when the driver is in drive (drivetrain engaged) and the vehicle is moving down the road.

SUMMARY

A method of warming a catalyst of an exhaust gas treatment system of a hybrid vehicle is provided. The hybrid vehicle includes an engine and an electric motor. The method includes transitioning a rotational speed of the engine to within a pre-defined speed range with the electric motor, and reducing an engine manifold pressure to within a pre-defined pressure range. The engine is fueled after the rotational speed of the engine is within the pre-defined speed range, and the engine manifold pressure is within the pre-defined pressure range. While the engine is being fueled, the engine manifold pressure is increased to within a catalyst light-off pressure range, and the torque output of the engine is increased to within a catalyst light-off operating torque range. The exhaust gas produced from the operation of the engine within the pre-defined speed range, within the catalyst light-off pressure range, and within the catalyst light-off operating torque range heats the catalyst while minimizing emissions.

Accordingly, the engine is started in a manner that provides an optimal feel to an operator when the hybrid drivetrain is engaged, and is operated at an optimum condition to minimize emissions while heating the catalyst.

The above features and advantages and other features and advantages of the present invention are readily apparent from the following detailed description of the best modes for carrying out the invention when taken in connection with the accompanying drawings.

DETAILED DESCRIPTION

Figure 1:
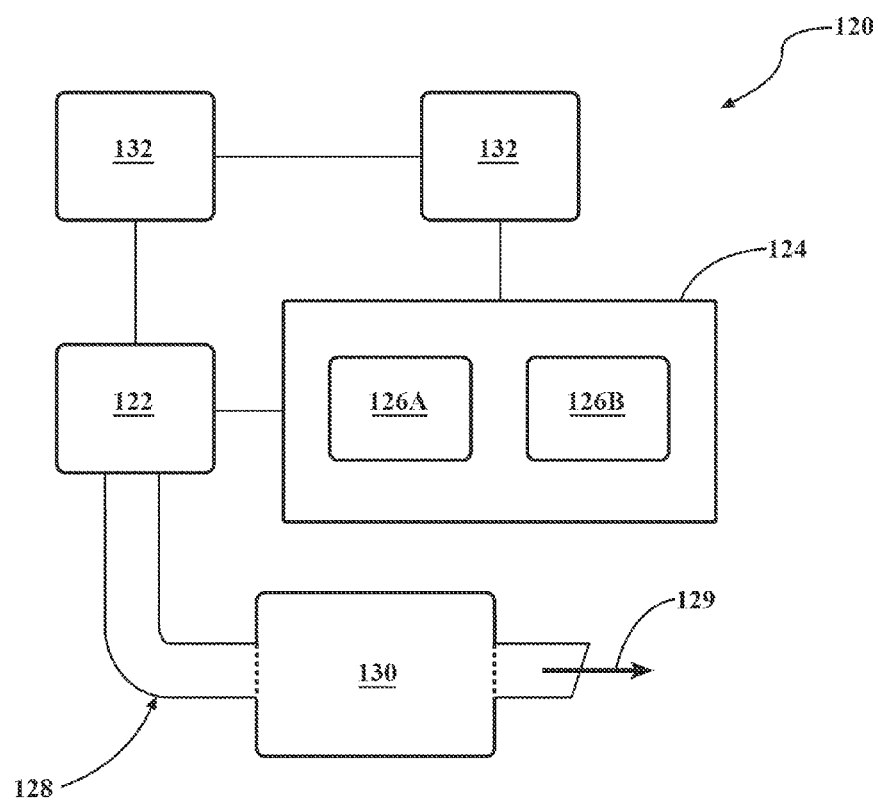
FIG. 1 is a schematic plan view of a hybrid vehicle.

A method of warming a catalyst of an exhaust gas treatment system of a hybrid vehicle 120 is provided. Referring to FIG. 1, the hybrid vehicle 120 includes an engine 122, such as but not limited to a gasoline or diesel engine, and a hybrid powertrain 124 including at least one electric motor 126, and preferably a first electric motor 126A and a second electric motor 126B. The hybrid vehicle 120 may operate under torque provided solely by the electric motor(s) 126A, 126B, torque provided solely by the engine 122, or on torque provided jointly by the engine 122 and the electric motor(s) 126A, 126B.

The engine 122 includes an exhaust gas treatment system 128 for treating exhaust gas 129 from the engine 122. The exhaust gas treatment system 128 uses a catalyst 130 to react with emissions from the engine 122 to convert the emissions into water and carbon dioxide as is known in the art. In order for the catalyst 130 to react with the exhaust gas 129, the catalyst 130 must be at or above a light-off temperature. The method described herein provides a strategy for heating the catalyst 130 when the vehicle 120 is being propelled by a combination of the engine 122 and the electric motor 126A, 126B. The strategy described herein is particularly useful in hybrid vehicles in which the primary propulsion is provided by the engine, but which initially starts moving under torque from the electric motor, i.e., a "silent start". The engine is then started later while the hybrid powertrain is already engaged under torque from the electric motor.

The method described herein is preferably embodied as an algorithm operable on at least one control module, or a combination of control modules cooperating together. For example, the control module(s) may include, but are not limited to an Engine Control Module (ECM) 132 and/or a Hybrid Control Processor (HCP) 134. The ECM 132 and the HCP 134 control the operation of the engine 122 and/or the hybrid powertrain 124 respectively. The control module(s) 132, 134 may include a computer and/or processor, and include all software, hardware, memory, algorithms, connections, sensors, etc., necessary to manage and control the operation of the engine 122 and/or hybrid powertrain 124. It should be appreciated that the control module may include any device capable of analyzing data from various sensors, comparing data, making the necessary decisions required to control the operation of the engine and/or hybrid powertrain, and executing the required tasks necessary to control the operation of the engine and/or hybrid powertrain.

Figure 2:
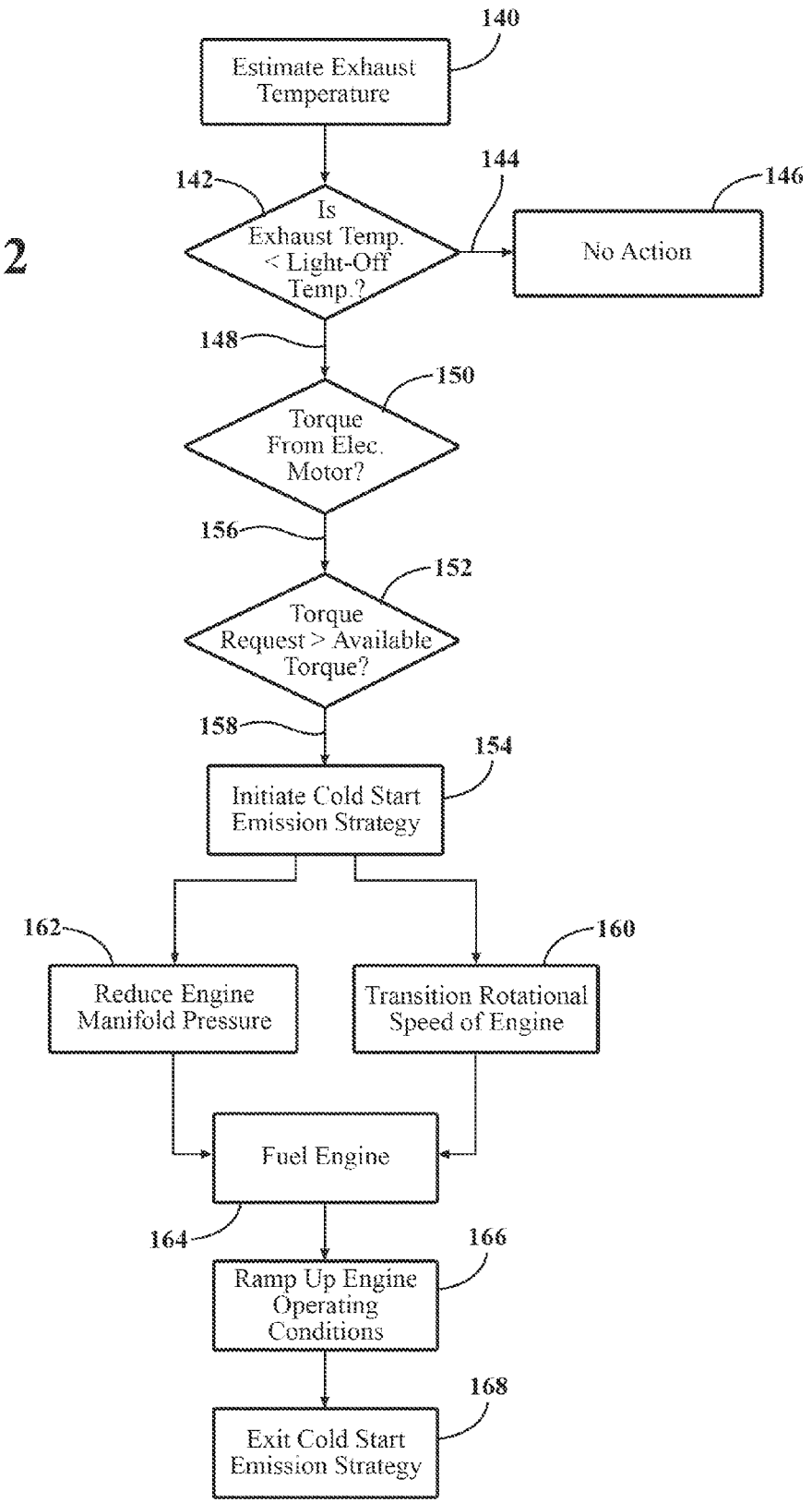
FIG. 2 is a flowchart representing a method of warming a catalyst of an exhaust gas treatment system of a hybrid vehicle.

Referring to FIG. 2, the method includes sensing or estimating a temperature of the catalyst, generally indicated by box 140. The temperature of the catalyst may be sensed in any suitable manner, including with one or more temperature sensors, or estimated based upon a model of the exhaust gas treatment system. The temperature of the catalyst is sensed to determine if the temperature of the catalyst is less than the light-off temperature, or if the temperature of the catalyst is greater than the light-off temperature, generally indicated by box 142. If the temperature of the catalyst is greater than the light-off temperature, generally indicated at 144, then a cold start emissions strategy does not need to be executed in order to heat the catalyst, generally indicated by box 146. However, if the temperature of the catalyst is below the light-off temperature, generally indicated at 148, then the cold start emissions strategy may be executed so that the heat from the exhaust gas from the engine heats the catalyst. The cold start emission strategy is employed to heat the catalyst when the vehicle is operating under certain conditions.

If the temperature of the catalyst is below the light-off temperature, generally indicated at 148, and the vehicle is operating under torque from the electric motor(s) only, i.e., the engine is not currently being fueled and running, as determined by box 150, and the driver's torque request exceeds the available torque output from the electric motor, as determined by box 152, then the control module may initiate the cold start emission strategy described below to heat the catalyst. Accordingly, when the temperature of the catalyst is below the light-off temperature, generally indicated at 148, the engine remains un-fueled, generally indicated at 156, until the battery state of charge gets too low, or the driver's torque demand gets too high, generally indicated at 158, for only the electric motor to accommodate, then the control module may initiate the cold start emission strategy 154. If the temperature of the catalyst is above the light-off temperature, generally indicated at 144, then the cold start emissions strategy is not required (the catalyst does not need to be heated), generally indicated by box 146 and the engine may be operated under a normal operating strategy to provide torque as needed and maintain the temperature of the catalyst above the light-off temperature.

The cold start emission strategy includes transitioning a rotational speed of the engine to within a pre-defined speed range with the electric motor, generally indicated by box 160, while the vehicle is being propelled by torque from the electric motor. Accordingly, it should be appreciated that the electric motor is providing torque to propel the vehicle, while simultaneously spinning the engine up to within the pre-defined speed range. The pre-defined speed range is an optimum operating rotational speed of the engine for executing the cold start emissions strategy. The pre-defined speed range is a rotational speed of the engine that balances enough exhaust energy (high enough flow) to heat the catalyst effectively, without providing more engine output power than the hybrid electric motors can consume, and without generating so much torque that the resultant noise would be intolerable. The pre-defined speed range also can not be so low that too little engine output power is provided, such that the cold start emissions strategy will not be able to execute a high percentage of the time. For example, if the cold start emissions strategy limits the engine output power to 10 Kw, and the emissions cycle shows that a torque request requires 30 Kw, then more torque is required from the engine than is produced by the engine during the cold start emissions strategy, and the cold start emissions strategy will be exited so that the engine may produce the required torque output. The pre-defined speed range may include a rotational speed range of between 1000 rpm and 1800 rpm, and more preferably between the range of 1200 rpm and 1400 rpm. However, it should be appreciated that the pre-defined speed range may vary from the exemplary values described above between different motor types, styles, and/or sizes.

While the electric motor is transitioning the rotational speed of the engine to within the pre-defined speed range, an engine manifold pressure is reduced to within a pre-defined pressure range, generally indicated by box 162. The pre-defined pressure range is an optimum operating manifold pressure range of the engine for starting the engine in the cold start emission strategy. The pre-defined pressure is set to a level that is high enough to promote stable clean combustion, yet low enough to minimize the on rush of torque as the engine is first fired. When an engine starts making torque it, goes from a negative torque, i.e., friction, to a neutral or positive value. When this happens, the electric motor must go from a positive torque to a less positive or negative value to provide the same output torque to the driver. The smaller the jump in engine torque, the easier it is to avoid having a torque disturbance to the driver. The engine manifold pressure is reduced by positioning an engine throttle in a minimum position, i.e., a closed position, to achieve a maximum pump down rate. The throttle is held at the minimum position until the engine manifold pressure falls to within a slow-down range of the pre-defined pressure range, at which time the throttle is opened to decrease the pump down rate in order to avoid overshooting the pre-defined pressure range. For example, if the pre-defined pressure range is between 45 kPa and 50 kPa, then the slow-down range may be 10-15 kPa above that. Accordingly, the manifold pressure will be reduced at the maximum pump down rate until approximately equal to 65 Kpa, at which time the throttle is adjusted to slow the pump down rate until the manifold pressure is between the pre-defined pressure range of 45 kPa to 50 kPa. The engine throttle may controlled and/or continuously adjusted to maintain the engine manifold pressure within the pre-defined pressure range.

Once the rotational speed of the engine is transitioned to within the pre-defined speed range, and the manifold pressure is reduced to within the pre-defined pressure range, then the engine may be fueled, i.e., started with retarded spark advance, generally indicated by box 164. The engine may be fueled with retarded spark advance for two primary reasons. Firstly, when the spark is at an optimum or advance value, as much of the energy as possible is transferred from combustion into the pistons for available torque. When the spark is retarded from the optimum value, some of the energy of combustion is no longer transferred to the piston for available torque, and is instead transferred into the exhaust as heat. This extra heat is used to increase the rate that the catalyst is heated. The second reason is to improve the combustion event itself. When the spark is fired at a retarded position, the pressure in the cylinder is lower. When the pressure is lower, more of the hydrocarbons come out of the crevices of the combustion chamber and take part in the combustion event.

In steady state catalyst heating, there is an optimum airflow, engine speed, and spark advance. This optimum airflow, engine speed, and spark advance defines the steady state torque that the engine will operate at while heating the catalyst. Once the engine is being fueled, the engine operating conditions are ramped to the optimum steady state set points and maintained until the catalyst is heated to the light off temperature, generally indicated by box 166. Accordingly, the engine manifold pressure is increased to within a catalyst light-off pressure range, torque output of the engine is increased to within a catalyst light-off operating torque range, and the spark advance is adjusted to a steady state optimal level. The catalyst light-off pressure range is the optimum manifold pressure range to yield the optimal airflow for the engine to operate at for heating the catalyst while minimizing torque output and emissions. The catalyst light-off operating torque range is the optimum torque output range that the engine may operate at to yield the optimal spark advance for heating the catalyst while achieving the optimum airflow for emissions. The torque output of the engine is increased because the airflow is being increased, and by ramping up the spark advance from a minimum point for starting the engine to the steady state optimal level for heating the catalyst. The spark ramping can be done directly through spark advance ramping or through a torque model calculated spark advance.

The exhaust gas produced from the operation of the engine within the pre-defined speed range, within the catalyst light-off pressure range, and within the catalyst light-off operating torque range heats the catalyst while minimizing emissions. Because the catalyst is not currently heated to the light-off temperature during this cold start emission strategy, and is therefore not efficiently reacting with the exhaust gas emissions, this strategy minimizes the exhaust gas emissions that are produced by the engine, thereby minimizing the emissions output from the exhaust gas treatment system.

Preferably, the rotational speed of the engine is maintained within the pre-defined speed range at the spark advance at the steady state optimum level while the engine is being fueled, and the torque output of the engine is maintained within the catalyst light-off operating torque range until the catalyst is heated to the light-off temperature. However, if a vehicle acceleration request is not achievable by the electric motor(s) alone under the current operating constraints of the electric motor, with the rotational speed of the engine within the pre-defined speed range and the torque output of the engine within the catalyst light-off operating torque range for heating the catalyst, then the cold start emissions strategy may be exited, generally indicated by box 168, and the rotational speed of the engine and the torque output of the engine may be adjusted away from the optimum level for catalyst heating to satisfy the vehicle acceleration request.

As noted above, the method of warming the catalyst of the exhaust gas treatment system of the hybrid vehicle may be embodied as one or more algorithms operable on the Engine Control Module (ECM) and the Hybrid Control Processor (HCP) to control the operation of the engine and the hybrid powertrain. In order to accomplish this, the ECM and the HCP must communicate between each other to implement the above described method. Accordingly, an exemplary embodiment of the communication between the ECM and the HCP to implement the method of warming the catalyst of the exhaust gas treatment system is provided below.

The ECM initiates the strategy by transmitting a Cold Start Emissions Control Active value equal to "true" to the HCP. Once the HCP receives the true value for the Cold Start Emissions Control Active value, the following strategy is be employed to start the engine.

Figure 3:
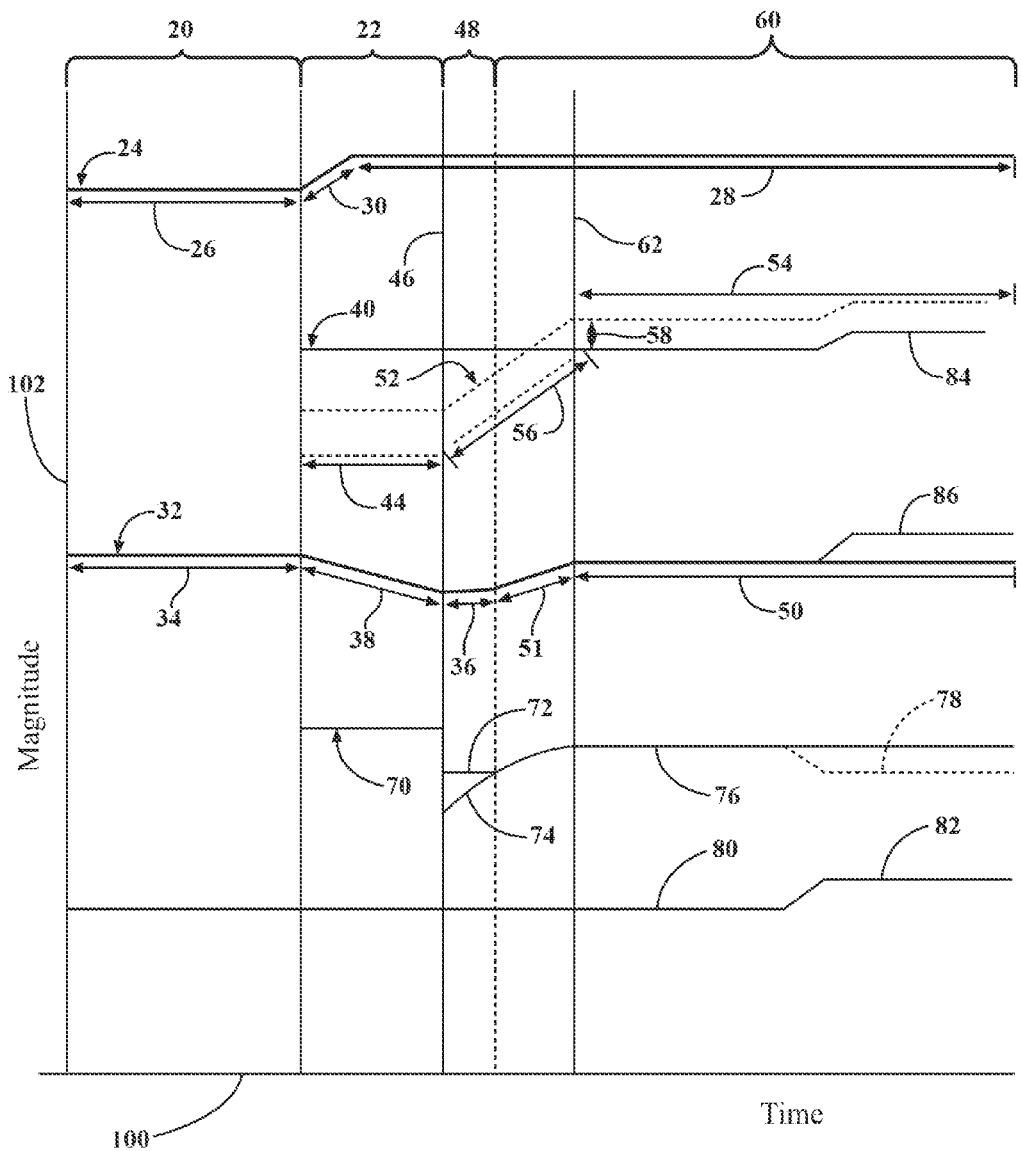
FIG. 3 is chart showing various operating parameters during different modes of a method for starting an engine of a hybrid vehicle to heat a catalyst of an exhaust gas treatment system.

Referring to FIG. 3, wherein like numerals indicated like parts throughout, a magnitude of various engine operating parameters are shown stacked vertically relative to each other in the Figure as viewed on the page, along a vertical axis 102, with the change in magnitude over time of the various engine operating parameters shown along a horizontal axis 100 of the Figure as viewed on the page, thereby distinguishing various operating modes, described in greater detail below. Accordingly, the Figure represents change in magnitude of the various engine operating parameters over time. When the HCP receives the true value for the Cold Start Emissions Control Active value, the HCP enables the cold start emissions strategy for the next start. When the HCP determines that it must start the engine (because the battery state of charge is too low or the drivers requested acceleration is too high), the HCP transitions a Hybrid Engine Start Stop Information: Engine Start Stop Mode from an engine stop mode, generally indicated at 20, to a Start Pending mode, generally indicated at 22. Once in the start pending mode 22, the HCP initiates a process to prepare the engine for starting prior to fueling the engine. As part of the start pending mode 22, the HCP transitions the rotational engine speed, generally indicated by line 24, to within the pre-defined speed range, which is the optimum speed for catalyst warm-up. The rotational engine speed is transitioned from an initial value of 0 rpm, indicated by line segment 26, to within the pre-defined speed range, indicated by line segment 28. The transition between the initial value 26 and the pre-defined speed range 28 is indicated by line segment 30. The HCP controls the electric motor to transition the rotational speed of the engine.

Additionally, as part of the start pending mode 22, the ECM positions its airflow controls, i.e., the engine throttle, to pump down the engine Manifold Absolute Pressure (MAP), generally indicated by line 32, to within the pre-defined pressure range, which is the optimum point where the torque is minimized when fuel is turned on while the combustion quality is still good enough for emissions controls. The engine manifold pressure is reduced from an initial value, indicated by line segment 34, to within the pre-defined pressure range, indicated by line segment 36. The transition between the initial pressure value 34 and the pre-defined pressure range 36 is indicated by line segment 38. It should be noted that when the engine is spinning without fuel while the catalyst is cool, that the engine will be pumping out some emissions that will negatively affect the emissions test. Therefore, depending on engine type (how much torque it produces when first fueled) and emission certification level, manifold pump down prior to fueling may or may not be desirable. The HCP holds the Hybrid Engine Start Stop Information: Engine Start Stop Mode at the Start Pending mode 22 until the engine Manifold Absolute Pressure is within the pre-defined pressure range 36.

While the Hybrid Engine Start Stop Information: Engine Start Stop Mode value is equal to the Start Pending Mode 22, the HCP transmits a Hybrid Commanded Engine Torque Predicted value, generally indicated by line 40 at the optimum torque set point for the Cold Start Emissions Strategy. This will be used by the ECM as an indication of where the torque production of the engine will go. During the start pending mode 22, the HCP should transmit a Hybrid Commanded Engine Torque Immediate value to be equal to an Engine Torque Minimum Capacity, generally indicated by line segment 44, with a Hybrid Commanded Engine Torque Response Type equal to Pleasability Limited. The Engine Torque Minimum Capacity value 44 is the amount of torque the engine consumes when spinning with the fuel off. The retarded spark is generally represented by line 70 in the Figure. If it is found that the retarded spark, generally represented by line segment 72, that is calculated from the torque model based upon the Hybrid Commanded Engine Torque Minimum Value 44 is unreliable under certain scenarios, it is possible to increase the immediate torque request from the Engine Torque Minimum Capacity level 44 and rely more on the ECM auto start spark advance controls (directly calibrated spark advance), generally indicated by line segment 74, and ramping to optimum spark.

Once the Engine Manifold Absolute Pressure 32 is brought to the point where fuel can be enabled, indicated by a vertical reference line 46, the HCP transitions the Hybrid Engine Start Stop Information: Engine Start Stop Mode from the start pending mode 22 to an Enable Fuel mode, generally indicated at 48. When in the Enable Fuel mode 48, the ECM should transition its airflow controls, i.e., the engine throttle, to prepare the Engine Manifold Absolute Pressure 32 for the airflow required for a CLO operating point. As described above, the CLO operating point is the optimal engine operating condition for heating the catalyst while minimizing torque output and emissions. The CLO operating point includes an optimum pressure range defined as the catalyst light-off pressure range, generally indicated by the line segment 50, and an optimum torque output defined as the catalyst light-off operating torque range, generally indicated by line segment 54 of the Hybrid Commanded Engine Torque Predicted value 40. This transition of airflow controls, generally indicated by line segment 51, may begin prior to the HCP transitioning to the enable fuel mode 48 to enable fueling of the engine because there are delays in airflow reaction from the control change.

When the Hybrid Engine Start Stop Information: Engine Start Stop Mode value is defined as the Enable Fuel mode 48, the HCP should blend the Hybrid Commanded Engine Torque Immediate value from the Engine Torque Minimum Capacity value 44 to the Hybrid Commanded Engine Torque Predicted value 40, which is indicated by line segment 56. This is done to manage the torque transition from negative torque to the positive torque CLO operating point, i.e., to within the catalyst light-off operating torque range 54. When the engine torque is ramped up, the hybrid controls will have the chance to react against it with the electric motor(s) and provide a pleasing feel in axle torque to the driver. Due to fueling delays and spark retard authority, the ECM may not be able to fully control the engine torque to the level requested by the Hybrid Commanded Engine Torque Immediate value, generally shown by line 52, but it will provide a target for the ECM to follow in transitioning to the positive torque CLO operating point. The difference between the Hybrid Commanded Engine Torque Immediate value 52 and the Hybrid Commanded Engine Torque Predicted for optimum CLO value 40 is generally indicated by the offset shown by dimension line 58.

During this phase of blending torque up to the optimum CLO Operating point, i.e., to within the catalyst light-off operating torque range 54, the ECM may use spark retard below the spark retard that is necessary to achieve the HCP's commanded Hybrid Commanded Engine Torque Immediate value 72. This may be necessary to provide an optimal feel when the fuel first comes on, because the torque model requested spark advance can't be used to request levels with that level of combustion instability. This ECM direct control of spark retard should blend and meet the torque model spark advance prior to the Hybrid Commanded Engine Torque Minimum Capacity value 44 ramping to the Hybrid Commanded Engine Torque Predicted value 40 in order for the system to be managing torque with the torque request.

While in the Enable Fuel mode 48, the HCP continues to transmit the Hybrid Commanded Engine Torque Predicted value 40 equal to the optimum torque set point for the Cold Start Emissions Strategy. This value is used by the ECM as an indication of where the torque production will go.

The ECM includes a torque reserve system that allows the ECM to control the airflow above the Hybrid Commanded Engine Torque Predicted value 40, but use spark retard to hold the torque down to the Hybrid Commanded Engine Torque Predicted value 40. The ECM creates a value that is the synthetic result of the predicted torque request, which is the available torque due to the actual airflow minus the torque reserve that is added for the catalyst light-off. This synthetic value is called the Engine Predicted Torque Without CLO reserve, and is generally indicated by line segment 76. During the cold start emissions strategy (while using startability direct airflow control and not controlling the airflow to follow Hybrid Commanded Engine Torque Predicted 40), the ECM initializes its CLO reserve system in a way that an Engine Predicted Torque Without CLO Reserve value 76 will follow the Hybrid Commanded Engine Torque Predicted value 40. This is done because the available air torque may be above the Hybrid Commanded Engine Torque Predicted value 40, but the ECM will use spark retard from optimal to hold the torque down at the Hybrid Commanded Engine Torque Predicted level 40 (to heat the catalytic converter). The HCP's Hybrid Commanded Engine Torque Immediate value 52 is limited to a maximum dependent upon the Engine Predicted Torque Without CLO Reserve 76. Therefore, by initializing Engine Predicted Torque Without CLO Reserve 76 to Hybrid Commanded Engine Torque Predicted 40, the ECM is signifying that the Hybrid Commanded Engine Torque Immediate value 52 is limited to Hybrid Commanded Engine Torque Predicted 40. It should be noted that this initialization does not effect the control of the airflow. The airflow control during this phase is still done with the direct airflow controls from tables and ramps. This initialization affects the estimated result of the airflow controls by determining Engine Predicted Torque Without CLO Reserve 76.

Once the HCP has ramped up the Hybrid Commanded Engine Torque Immediate value 52 to the ECM's Engine Predicted Torque Without CLO Reserve value 76, the HCP should transition a Hybrid Commanded Engine Torque Response Type from an Active value, generally indicated by the Engine Predicted Torque Without CLO Reserve value 76, to an Inactive value, generally indicated by line segment 78. If the Hybrid Commanded Engine Torque Response Type value were left at the active value, the spark retard would be dictated by the Hybrid Commanded Engine Torque Immediate value 52, which would be suboptimal for CLO control.

When the ECM has determined that it has airflow controlled to an appropriate point for CLO, the ECM shall transition its airflow controls from direct airflow control to a torque management mode that follows the Hybrid Commanded Engine Torque Predicted value 40, but adds the appropriate amount of torque reserve (extra airflow) to achieve the desired CLO spark retard. This may require an initialization system to match airflow request from the direct airflow control to the torque management mode followed by blending to the steady state level of airflow control by torque management with the CLO torque reserve system.

The HCP shall hold both the Hybrid Commanded Engine Torque Predicted value 40 and the engine speed 24 at a point that is optimal for CLO until the Cold Start Emissions Control Active transitions to False, i.e., until the catalyst is heated to the light-off temperature. However, if the HCP receives an acceleration request that cannot be achieved by the electric motor, under the current battery and electric motor constraints, with the engine operating at the CLO optimum operating point, then the CLO strategy may be aborted by the HCP. The HCP aborts the CLO strategy when the driver's acceleration request is too high to be satisfied while the engine produces the torque level that is optimum for CLO. This means that the HCP may have to move the Hybrid Commanded Engine Torque Predicted value 40 away from the optimum CLO set point.

The HCP transitions into the Hybrid Engine Start Stop Information: Engine Start Stop Mode value to a Producing Torque mode, generally indicated at 60, when it observes combustion from the engine. This may occur before the ECM is ready to transition from direct airflow control to torque control of airflow, generally indicated by the vertical reference line 62, because it takes time to bring the manifolds airflow into the desired state. The ECM should honor the Hybrid Commanded Engine Torque Predicted value 40 (with normally accepted delays to a predicted request) within 1 second (allowing enough time for the ECM to get the manifold pressure under control) of the Hybrid Engine Start Stop Information: Engine Start Stop Mode value transitioning to the Producing Torque mode 60. If the Hybrid Commanded Engine Torque Predicted value 40 moves to a point where the engine cannot simultaneously honor the request and achieve the catalyst light off set points, then the ECM will have to abort or sub optimize the catalyst light off function in order to achieve the HCP's torque request.

The airflow of a typical gasoline spark ignited engine is controlled with at least a throttle blade (front of intake manifold) and intake and exhaust cam phasing. The throttle blade controls the flow of airflow into the intake manifold. The cam phasers control the flow of air from the intake manifold into the cylinders. Cam phasers are typically oil pressure driven devices. When an engine is started, it takes time to build up oil pressure. This means that the cam phasers are not available as an actuator for some time during an engine start. It typically takes 2-3 seconds before the cam phasers are available for actuation. Prior to the cam phasers being available, they are typically held in place with a locking pin to their parked positions, generally indicated by line segment 80. Often the parked position 80 of the cam phasers is set at a low airflow position to assist in auto start feel. When the cam phasers are parked in this way, the engine may not be able to flow enough air to meet the cold start emissions optimum operating point. If the steady state cold start emission operating point is requested, the cam phasers are parked and the throttle is open, the only way to make the requested torque is to advance the spark toward optimum. If this is done, catalyst heating and combustion quality will be sacrificed. Therefore, when the cam phasers are parked, it is desirable for the hybrid control system predicted torque request to request an operating level for the start that is the amount of torque that can be achieved at the optimum spark for catalyst heating with an airflow that can be achieved with the cam phasers parked. After the cam phasers are enable, generally indicated by line segment 82, the hybrid controls can transition the hybrid commanded predicted torque request value 40 to the steady state catalyst warm-up emissions torque level, generally indicated by line segment 84. Once the cam phasers are enabled 82, the manifold pressure 32 may also be increased, as indicated by line segment 86, to maintain the spark retard at the Engine Predicted Torque Without CLO reserve value 76.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of warming a catalyst of an exhaust gas treatment system of a hybrid vehicle having an engine and an electric motor, the method comprising:
   transitioning a rotational speed of the engine to within a pre-defined speed range with the electric motor;
   reducing an engine manifold pressure to within a pre-defined pressure range;
   fueling the engine after the rotational speed of the engine is within the pre-defined speed range and the engine manifold pressure is within the pre-defined pressure range;
   increasing the engine manifold pressure to within a catalyst light-off pressure range while the engine is being fueled; and
   increasing torque output of the engine to within a catalyst light-off operating torque range while the engine is being fueled;
   wherein exhaust gas produced from the operation of the engine within the pre-defined speed range, within the catalyst light-off pressure range, and within the catalyst light-off operating torque range heats the catalyst while minimizing emissions.

2. A method as set forth in claim 1 wherein fueling the engine is further defined as fueling the engine with retarded spark advance of the engine.

3. A method as set forth in claim 2 further comprising adjusting the retarded spark advance of the engine while increasing torque output of the engine to within the catalyst light-off operating torque range.

4. A method as set forth in claim 1 wherein transitioning the rotational speed of the engine with a first electric motor is further defined as transitioning the rotational speed of the engine with the first electric motor while the vehicle is being propelled by torque from a second electric motor and the output of the first electric motor and the engine.

5. A method as set forth in claim 1 further comprising maintaining the rotational speed of the engine within the pre-defined speed range while the engine is being fueled, and maintaining the torque output of the engine within the catalyst light-off operating torque range until the catalyst is heated to a light-off temperature.

6. A method as set forth in claim 1 further comprising controlling engine manifold pressure and spark advance to adjust the torque output of the engine directly.

7. A method as set forth in claim 6 further comprising transitioning control of the torque output from direct control of the engine manifold pressure and spark advance to a torque based engine control strategy when the engine manifold pressure is within the catalyst light-off pressure range and the torque output of the engine is within the catalyst light-off operating torque range.

8. A method as set forth in claim 1 wherein the catalyst light-off operating torque range and the pre-defined speed range are defined to maximize catalyst heating with minimum emissions, while providing engine power output sufficient to complete catalyst heating under normal vehicle operating conditions.

9. A method as set forth in claim 1 further comprising operating the engine at a first torque level with cam phasers disabled, and operating the engine at a second torque level with cam phasers enabled.

10. A method as set forth in claim 1 wherein reducing the engine manifold pressure includes positioning an engine throttle in a minimum position to achieve a maximum pump down rate.

11. A method as set forth in claim 10 wherein reducing the engine manifold pressure is further defined as reducing the engine manifold pressure at the maximum pump down rate until the engine manifold pressure is within a slow-down range of the pre-defined pressure range.

12. A method as set forth in claim 10 further comprising controlling the engine throttle to maintain the engine manifold pressure within the pre-defined pressure range.

* * * * *